(12) United States Patent
Hamilton

(10) Patent No.: US 11,361,251 B2
(45) Date of Patent: Jun. 14, 2022

(54) SYSTEMS AND METHODS OF PROCESSING DIVERSE DATA SETS WITH A NEURAL NETWORK TO GENERATE SYNTHESIZED DATA SETS FOR PREDICTING A TARGET METRIC

(71) Applicant: Nasdaq, Inc., New York, NY (US)

(72) Inventor: Douglas Hamilton, Boston, MA (US)

(73) Assignee: Nasdaq, Inc., New York, NY (US)

( * ) Notice: Subject to any disclaimer, the term of this patent is extended or adjusted under 35 U.S.C. 154(b) by 183 days.

(21) Appl. No.: 16/744,236

(22) Filed: Jan. 16, 2020

(65) Prior Publication Data
US 2020/0226468 A1    Jul. 16, 2020

Related U.S. Application Data

(60) Provisional application No. 62/792,937, filed on Jan. 16, 2019.

(51) Int. Cl.
*G06N 20/00* (2019.01)
*G06N 3/08* (2006.01)
*G06N 3/063* (2006.01)
*G06N 3/04* (2006.01)

(52) U.S. Cl.
CPC ........... *G06N 20/00* (2019.01); *G06N 3/0445* (2013.01); *G06N 3/0454* (2013.01); *G06N 3/0481* (2013.01); *G06N 3/063* (2013.01); *G06N 3/08* (2013.01)

(58) Field of Classification Search
CPC ........ G06N 3/063; G06N 3/08; G06N 3/0445; G06N 3/0454; G06N 20/00; G06K 9/6256–9/6259
See application file for complete search history.

(56) References Cited

U.S. PATENT DOCUMENTS

| 6,401,082 | B1 | 6/2002 | Kropas-Hughes et al. |
| 7,080,053 | B2 * | 7/2006 | Adams .................... G06N 3/082 |
| | | | 706/25 |
| 9,342,793 | B2 * | 5/2016 | Williamson ............. G06N 3/08 |
| 10,089,576 | B2 | 10/2018 | Gao et al. |

(Continued)

OTHER PUBLICATIONS

A. Trask et al, "Neural Arithmetic Logic Units," arXiv:1808.00508, Aug. 1, 2018, pp. 1-15.

(Continued)

*Primary Examiner* — Alan Chen
(74) *Attorney, Agent, or Firm* — Nixon & Vanderhye P.C.

(57) ABSTRACT

A computer system receives and stores data sets, a target metric, and a parameter that indicates a desired number of synthesized data sets. A hardware processor performs operations where each processing node of a neural network weights input data set values, determines gating operations to select processing operations, and generates a node output by applying the gating operations to weighted input data set values. The neural network is trained by modifying the gating operations, the input weight values, and the node output weight value until convergence. One or more nodes is selected having a larger magnitude node output weight value. Selected input data set values are processed with selected processing nodes using a selected subset of gating operations to produce the desired number of synthesized data sets. Names are generated for each of the synthesized data sets.

20 Claims, 15 Drawing Sheets

(56) References Cited

U.S. PATENT DOCUMENTS

| | | | |
|---|---|---|---|
| 11,048,739 B2* | 6/2021 | Pearce | G06F 16/337 |
| 11,182,668 B2* | 11/2021 | Martin | G06F 7/5443 |
| 2013/0124171 A1 | 5/2013 | Schuette et al. | |
| 2019/0108436 A1* | 4/2019 | David | G06N 3/105 |
| 2019/0188567 A1* | 6/2019 | Yao | G06N 3/08 |
| 2019/0251442 A1* | 8/2019 | Koivisto | G06N 3/082 |
| 2021/0182683 A1* | 6/2021 | Dai | G06N 3/0454 |

OTHER PUBLICATIONS

G. Montavon et al, "Explaining nonlinear classification decisions with deep Taylor decomposition," *Pattern Recognition*, vol. 65, May 2017, available online Nov. 30, 2016, pp. 211-222.

M.T. Ribeiro et al, "'Why should I Trust You?' Explaining the Predictions of Any Classifier," arXiv: 1602.04938, Aug. 9, 2016, 10 pages.

Y. LeCun et al, "Deep Learning," *Nature* vol. 521, May 28, 2015, 35 pages.

International Search Report and Written Opinion of the International Searching Authority for PCT/US2020/013784 dated Apr. 14, 2020, 13 pages.

S. Shamdasani, "Build a Neural Network," *Enlight*, Oct. 4, 2017, retrieved on Mar. 17, 2020 from https://enlight.nyc/projects/neural-network/, 21 pages.

X. Wang et al, "Understanding Gating Operations in Recurrent Neural Networks through Opinion Expression Extraction," *Entropy*, Aug. 11, 2016, retrieved on Mar. 17, 2020 from https://mdpi.com/1099-4300/18/8/294/pdf, pp. 1-21.

N. V. Chawla et al, "SMOTEBoost: Improving Prediction of the Minority Class in Boosting," *European conference on principles of data mining and knowledge discovery*, 2003, retrieved on Mar. 17, 2020 from https://ink.springer.com/content/pdf/10.1007/978-3-540-398402-2_12.pdf, 13 pages.

T. Sarkar et al, "Synthetic data generation—a must-have skill for new data scientists," *Medium*, Dec. 19, 2018, retrieved on Mar. 17, 2020 from https://towardsdatascience.com/synthetic-data-generation-a-must-have-skill-for-new-data-scientists-915896c0c1ae, 21 pages.

* cited by examiner

Example: Federal Reserve Data set

|   | DATE | UNRATE | WTISPLC | INDPRO | CPIAUCSL |
|---|---|---|---|---|---|
| 0 | 1948-01-01 | 3.4 | 2.57 | 14.7601 | 23.680 |
| 1 | 1948-02-01 | 3.8 | 2.57 | 14.7878 | 23.670 |
| 2 | 1948-03-01 | 4.0 | 2.57 | 14.6217 | 23.500 |
| 3 | 1948-04-01 | 3.9 | 2.57 | 14.6494 | 23.820 |
| 4 | 1948-05-01 | 3.5 | 2.57 | 14.8986 | 24.010 |
| 5 | 1948-06-01 | 3.6 | 2.57 | 15.0924 | 24.150 |
| 6 | 1948-07-01 | 3.6 | 2.57 | 15.0924 | 24.400 |
| 7 | 1948-08-01 | 3.9 | 2.57 | 15.0370 | 24.430 |
| 8 | 1948-09-01 | 3.8 | 2.57 | 14.9263 | 24.360 |
| 9 | 1948-10-01 | 3.7 | 2.57 | 15.0371 | 24.310 |

DATE: Date, index of data set
UNRATE: Unemployment Rate (Target)
WTISPLC: West Texas Crude Oil Spot Price
INDPRO: Industrial Productivity
CPIAUCSL: Consumer Price Index

FIG. 8

Example: Synthesized Data Sets

| | Scaled CPIAUCSL-INDPRO | Scaled WTISPLC per INDPRO and CPIAUCSL | Scaled WTISPLC per CPIAUCSL | Scaled INDPRO-WTISPLC | Scaled INDPRO per CPIAUCSL |
|---|---|---|---|---|---|
| 0 | 4.556522 | -3.997218 | -0.828939 | 3.146170 | -0.018855 |
| 1 | 4.559922 | -4.000294 | -0.829210 | 3.147407 | -0.016841 |
| 2 | 4.538656 | -3.980998 | -0.819319 | 3.136895 | -0.015887 |
| 3 | 4.558447 | -3.993997 | -0.837624 | 3.142529 | -0.032801 |
| 4 | 4.586643 | -4.047055 | -0.847211 | 3.157376 | -0.030488 |
| 5 | 4.607997 | -4.087614 | -0.854219 | 3.168712 | -0.028264 |
| 6 | 4.621763 | -4.110283 | -0.868639 | 3.171383 | -0.042583 |
| 7 | 4.619522 | -4.105038 | -0.870674 | 3.169665 | -0.047227 |
| 8 | 4.607877 | -4.082774 | -0.867246 | 3.163321 | -0.049074 |
| 9 | 4.612942 | -4.094171 | -0.863752 | 3.168107 | -0.040353 |

CPIAUCSL-INDPRO: Product of CPI and Industrial Productivity
WTISPLC per INDPRO and CPIAUCSL: differential between Crude Oil Prices and the sum of industrial productivity and CPI
WTISPLC per CPIAUCSL: Ratio of Crude Oil Prices to CPI
INDPRO-WTISPLC: Product of industrial productivity and crude oil price
INDPRO per CPIAUCSL: Ratio of Industrial productivity to CPI

FIG. 10

Example: Selection of Most Important Input Data Sets

Example: Gate Operator Selection

SYSTEMS AND METHODS OF PROCESSING DIVERSE DATA SETS WITH A NEURAL NETWORK TO GENERATE SYNTHESIZED DATA SETS FOR PREDICTING A TARGET METRIC

CROSS REFERENCE(S) TO RELATED APPLICATION(S)

This application claims priority to U.S. provisional Patent Application 62/792,937 filed on Jan. 16, 2019, the entire contents of which are hereby incorporated by reference.

TECHNICAL OVERVIEW

The technology described herein relates to generating synthesized data sets from diverse data. More particularly, the technology relates to automatically generating synthesized data sets, derived from diverse data sets using a neural network, that are useful for predicting a target metric.

Introduction

Modern society generates vast amounts of diverse data. Data can from vary from weather data (e.g., temperature), to traffic data (e.g., a volume of cars on a given road), to service call data (e.g., a number of calls received), to financial data (e.g., the price of a stock), to electrical consumption data, and to many other forms of data. Finding correlations or links between diverse types of data and a target problem (e.g., predicating a hurricane) can be valuable in modern society.

However, finding correlations among a large number of diverse data inputs that may provide a useful new data metric, e.g., for quantitatively assessing, controlling, and/or selecting something such as a process, event, or institution, is a difficult and challenging technical problem due to combinatorial explosion. For example, given hundreds or thousands of different data sets (each data set containing many different values), the number of possible data set combinations is simply too large to process. Moreover, from all of the possible data set combinations, only a subset are likely to be useful. But there are no data processing systems or techniques that efficiently and accurately identify a useful subset of data sets. Another technical problem is that when new data sets can be generated by a data processing system, those new data sets will likely not be understandable to a human, and therefore, the usefulness of synthesized data sets may not be apparent to a human.

Accordingly, it will be appreciated that new and improved techniques, systems, and processes are continually sought after in these and other areas of technology.

SUMMARY

A computer system includes one or more user input adaptors configured to receive input data sets, a target metric, and a parameter that indicates a desired number of synthesized data sets to be generated. A memory stores instructions and data including the input data sets, the target metric, the parameter that indicates a desired number of synthesized data sets, and a neural network. The neural network includes a summing node and multiple processing nodes. At least one hardware processor is configured to perform operations that include each processing node processing the input data sets including weighting input data set values with corresponding input weight values to produce weighted input data set values, determining gating operations to select processing operations, and generating a node output by applying gated processing operations to the weighted input data set values. The node output is weighted with a node output weight value to produce a weighted node output. The weighted outputs from the multiple processing nodes are combined in a summing node in the neural network to produce a value for the target parameter.

The at least one hardware processor is configured to perform further operations that include iteratively training the neural network by modifying the gated processing operations, the input weight values, and the node output weight value until the neural network reaches a convergence state at a converged target value for the target parameter. When the neural network reaches the convergence state, the hardware processor is configured to select one or more nodes of the multiple processing nodes that have a larger magnitude node output weight value.

For each of the selected processing nodes, multiple ones of the input data sets are selected from among the input data sets used as input for the corresponding selected processing node that have a larger magnitude input data set weight value. Furthermore, for each of the selected processing nodes, a subset of the gated processing operations is selected. All of these selections significantly increases the data processing speed of the neural network and the usefulness of its outputs.

The at least one hardware processor is then configured to process the selected input data set values with the selected processing nodes using the selected subset of gating operations to produce one or more synthesized data sets. The hardware processor is configured to generate a human-understandable name for each of the one or more synthesized data sets based on names of the selected input data sets and the selected subset of gating operations.

The hardware processor is configured to store the one or more combined data sets and the human-understandable name for the one or more combined data sets in the one or more databases and/or provides an output of the one or more combined data sets and the human-understandable name for the one or more combined data sets to a user device.

This Summary is provided to introduce a selection of concepts that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

These and other features and advantages will be better and more completely understood by referring to the following detailed description of example non-limiting illustrative embodiments in conjunction with the drawings of which:

FIG. 8 is a table that illustrates example data sets for use in an example application to certain Federal Reserve data according to example embodiments;

FIG. 10 is a table that illustrates example synthesized data sets and human-readable names for the synthesized data sets according to the Federal Reserve data example application according to example embodiments;

DETAILED DESCRIPTION

Figure 1:
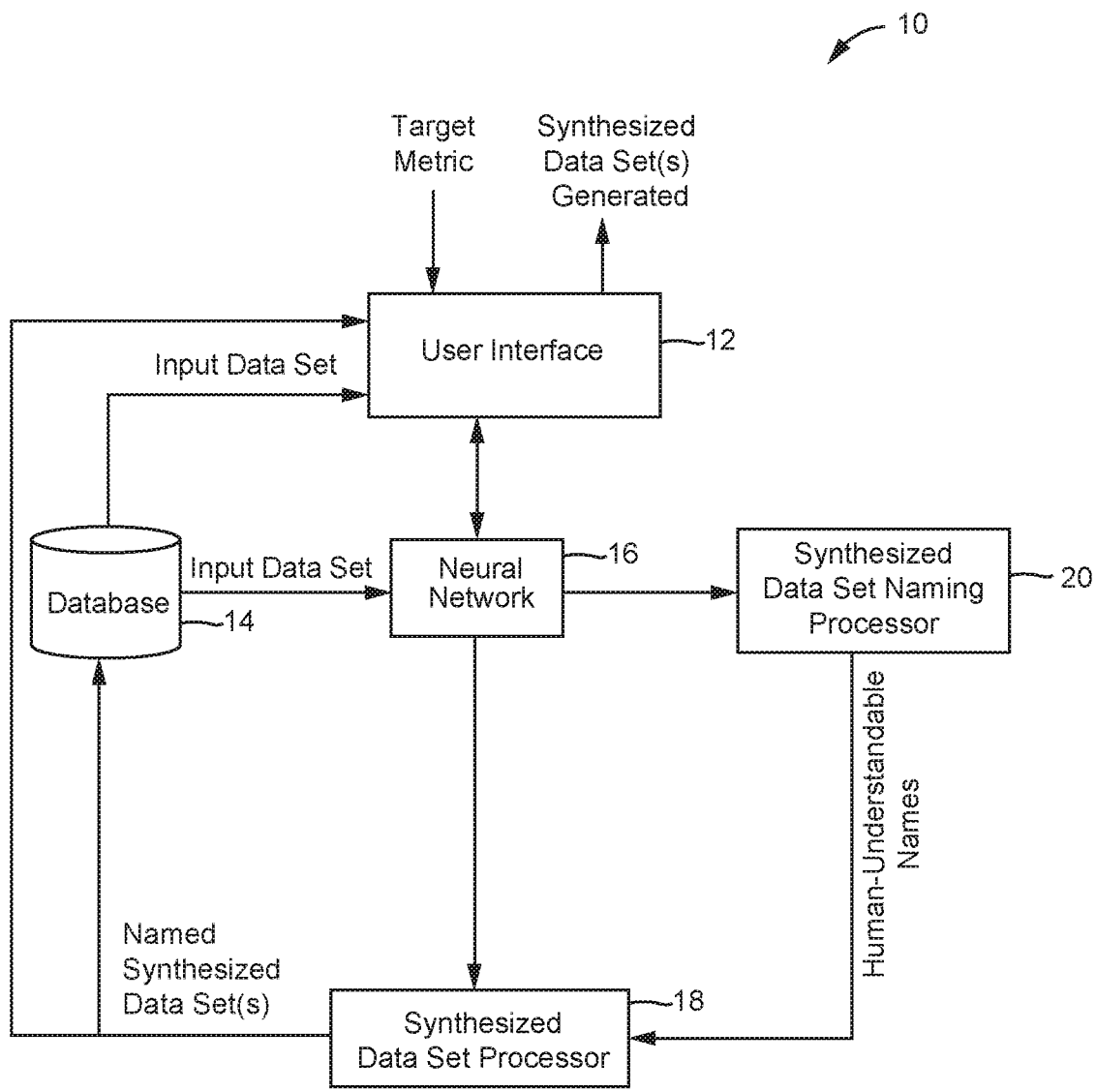
FIG. 1 is an example computer system diagram according to certain example embodiments.

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

Overview

Certain example embodiments relate to a computer system includes one or more user input adaptors configured to receive input data sets, a target metric, and a parameter that indicates a desired number of synthesized data sets to be generated. A memory stores instructions and data including the input data sets, the target metric, the parameter that indicates a desired number of synthesized data sets, and a neural network. The neural network includes a summing node and multiple processing nodes. At least one hardware processor is configured to perform operations that include each processing node processing the input data sets including weighting input data set values with corresponding input weight values to produce weighted input data set values, determining gating operations to select processing operations, and generating a node output by applying gated processing operations to the weighted input data set values. The node output is weighted with a node output weight value to produce a weighted node output. The weighted outputs from the multiple processing nodes are combined in a summing node in the neural network to produce a value for the target parameter.

The hardware processor (e.g., the computing node 500 shown in FIG. 16) is configured to perform operations that include iteratively training the neural network by modifying the gated processing operations, the input weight values, and the node output weight value until the neural network reaches a convergence state at a converged target value for the target parameter. When the neural network reaches the convergence state, the hardware processor selects one or more nodes of the multiple processing nodes that have a larger magnitude node output weight value.

For each of the selected nodes, multiple ones of the input data sets are selected from among the input data sets used as input for the corresponding selected processing node that have a larger magnitude input data set weight value. Furthermore, for each of the selected processing nodes, a subset of the gated processing operations is selected. All of these selections significantly increases the data processing speed of the neural network and the usefulness of its outputs.

The neural network then processes the selected input data set values with the selected processing nodes using the selected subset of gated processing operations to produce one or more synthesized data sets. The hardware processor generates a human-understandable name for each of the one or more synthesized data sets based on names of the selected input data sets and the selected subset of gating operations.

The hardware processor stores the one or more combined data sets and the human-understandable name for the one or more combined data sets in the one or more databases and/or provides an output of the one or more combined data sets and the human-understandable name for the one or more combined data sets to a user device.

The technological improvements offered by the technology described herein can be applied in different domains, from health care, to media, to education, to finance, to security, to transportation, and many other industries and domains, to analyze very large numbers of different input data sets and generate useful synthesized data sets efficiently and accurately. In addition, the synthesized data sets are automatically named using human-understandable names to make the usefulness of the synthesized data sets significantly more apparent to a human user. Finally, the synthesized data sets are sufficiently generalized to also be useful for other predictive and research tasks and applications.

Figure 2A:
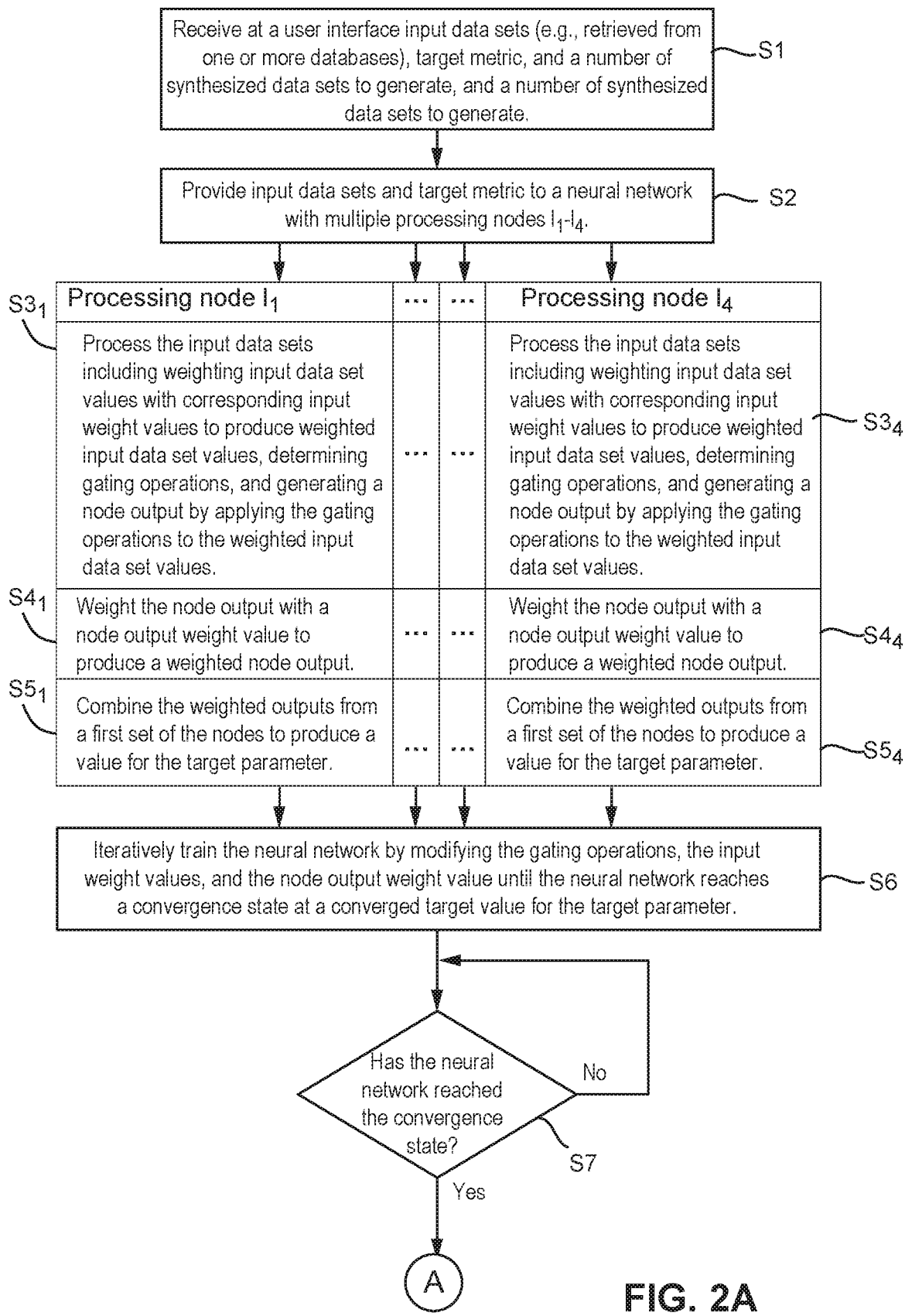
FIGS. 2A-2B are a flowchart showing example computer-implemented procedures according to certain example embodiments.
Figure 2B:
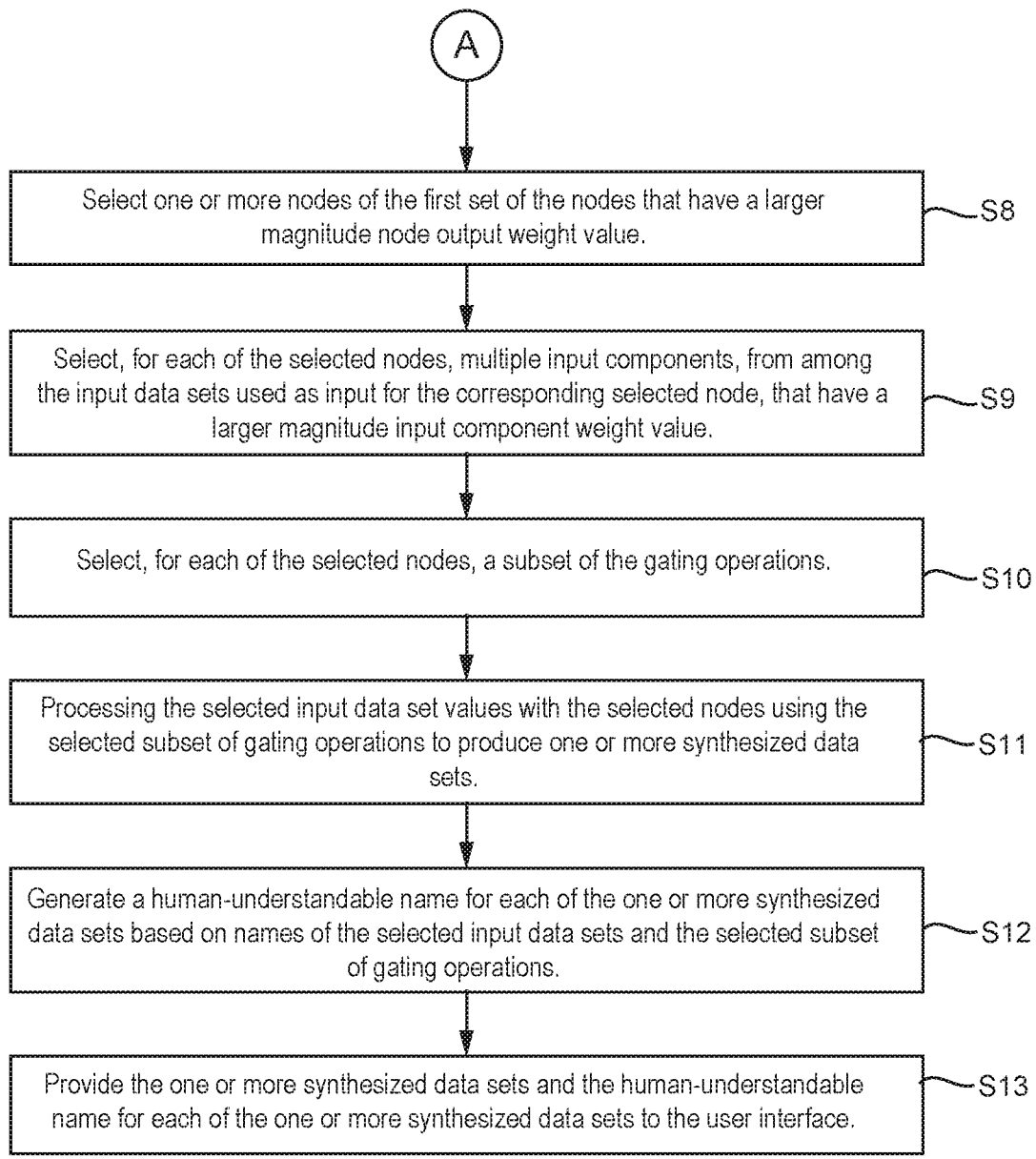
Figure 3:
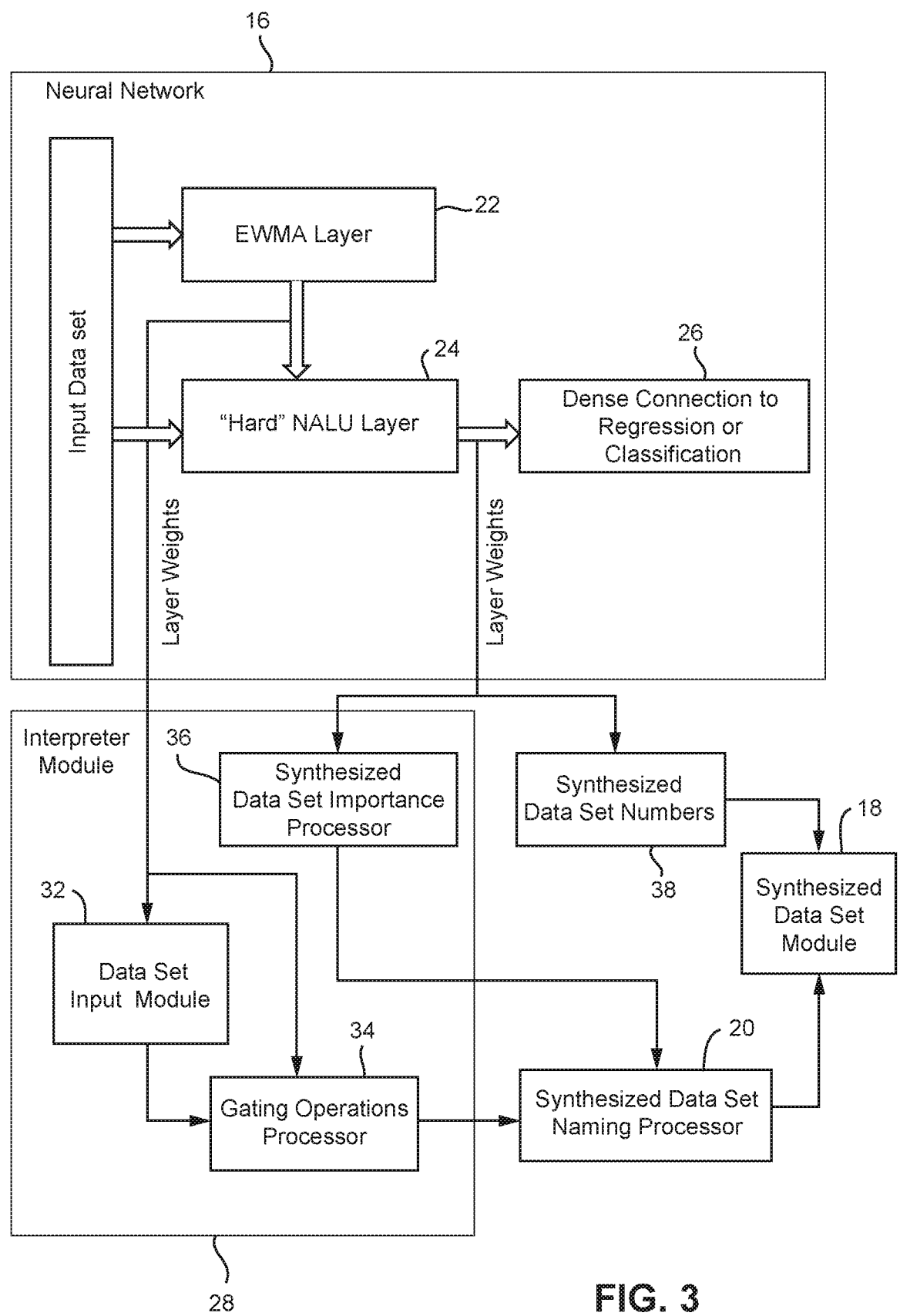
FIG. 3 illustrates sub-system diagram showing functional modules of a neural network and an interpreter module according to certain example embodiments.
Figure 4:
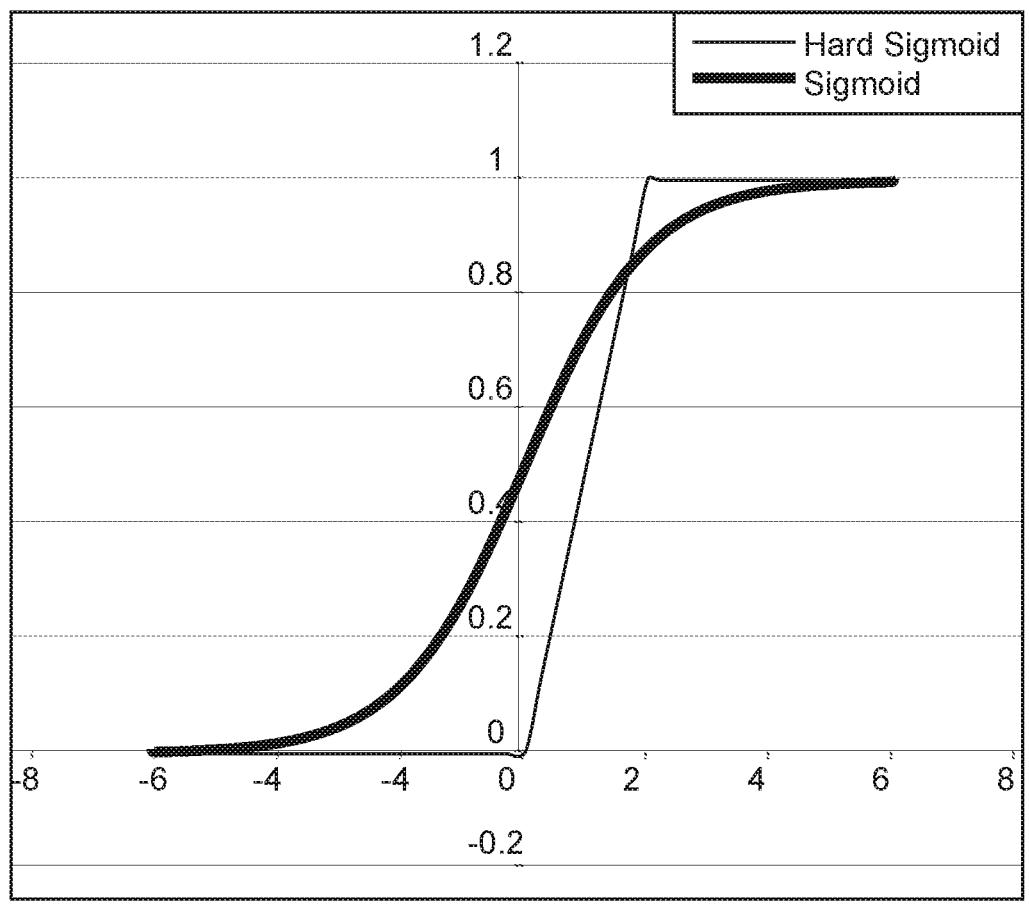
FIG. 4 is a graph that illustrates a hard sigmoid function compared to a traditional sigmoid function used in processing nodes of the neural network according to certain example embodiments.
Figure 5:
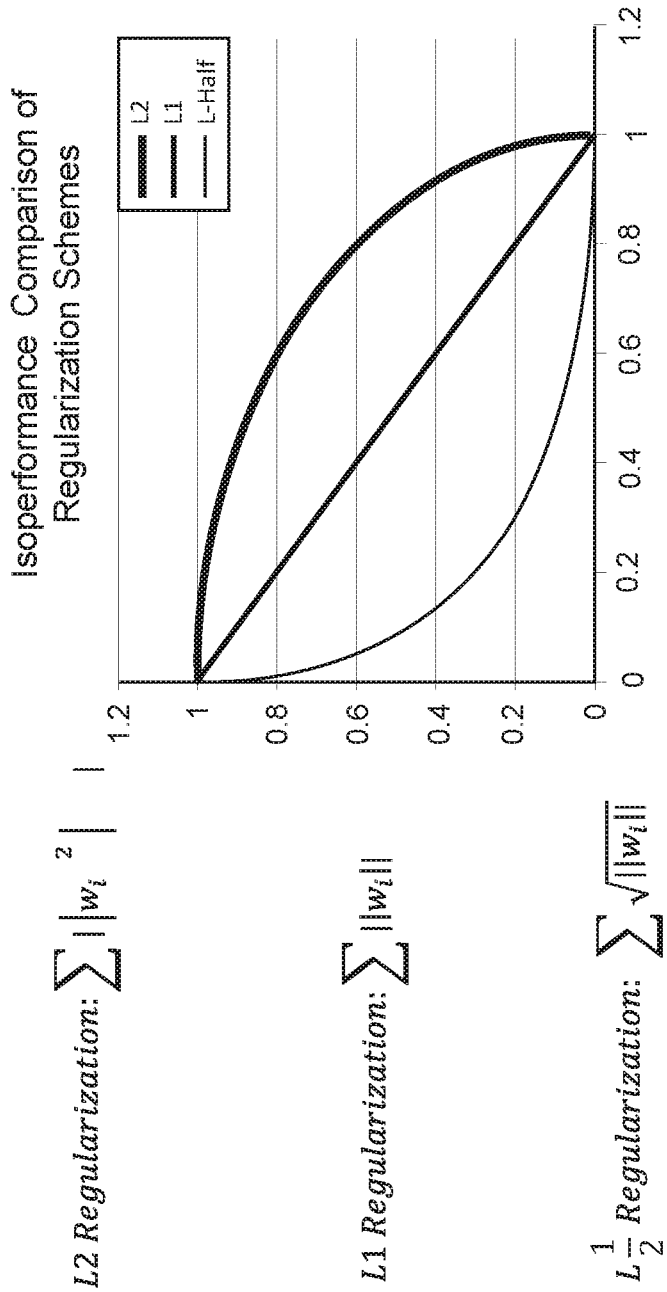
FIG. 5 is a graph that illustrates three L-type regularizations of the neural network weights.
Figure 7:
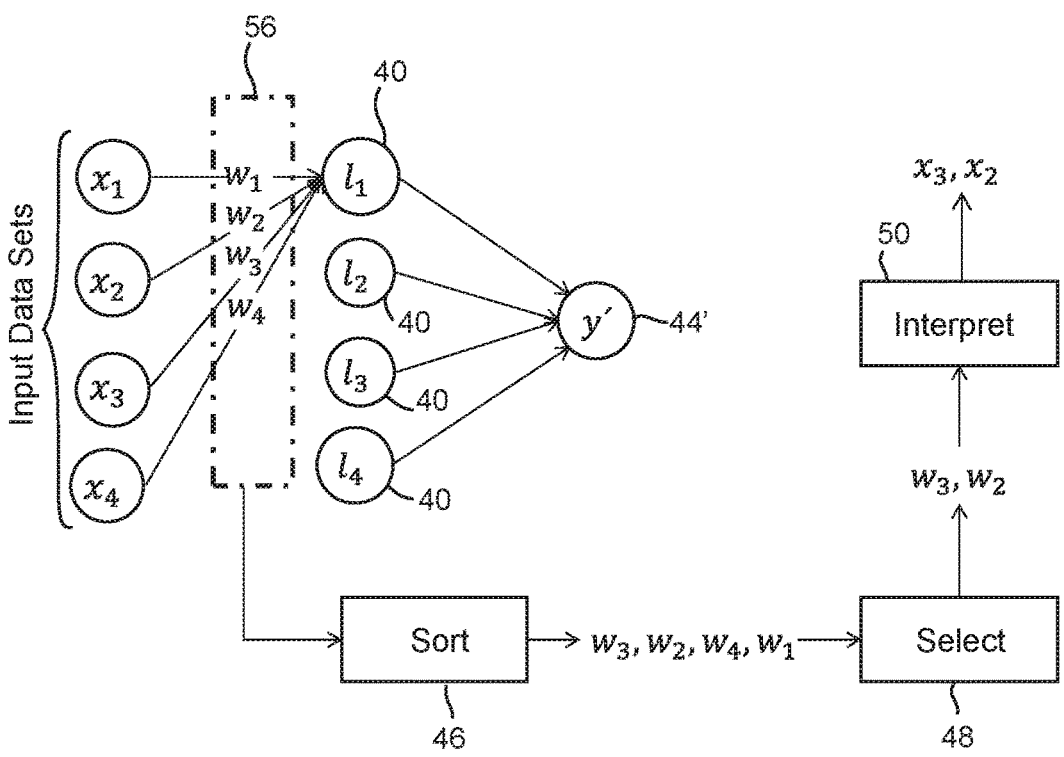
FIG. 7 is a diagram that illustrates example processing functions and data flow for processing input data sets, after the neural network is trained, to determine the most significant input data sets according to example embodiments.

FIG. 1 is an architecture diagram that shows components of the described system, including the neural network; FIGS. 2A-2B illustrate a method performed in FIG. 1's architecture; FIG. 3 shows further detailed software modules for a part of FIG. 1's architecture; FIGS. 4 and 5 are graphs that illustrate example gating and weighting operations, respectively, carried out in the neural network; FIGS. 7 and 8 are diagrams showing examples of neural network training and operation of the neural network once trained; FIGS. 8-15 relate to an example data set that can be processed with the architecture of FIG. 1 and the method of FIGS. 2A-2B; and FIG. 16 is shows an example computing system to can be used to implement the architecture of FIG. 1 and the method of FIGS. 2A-2B.

Description of Computer System—FIG. 1

FIG. 1 is a computer system diagram according to certain example embodiments. In many places in this document, including the description of FIG. 1, computer-implemented function blocks, functions, and actions may be implemented using software modules. It should be understood that function blocks, functions, and/or actions performed by software module(s) or processing node(s) are actually implemented by underlying hardware (such as at least one hardware processor and at least one memory device) according to program instructions specified by the software module(s). Details of an example computer system with at least one hardware processor and at least one memory device are provided in the description of FIG. 16. In addition, the described function blocks, functions, and actions may also be implemented using various configurations of hardware (such as ASICs, PLAs, discrete logic circuits, etc.) alone or in combination with programmed computer(s).

Computer system 10 receives and processes data from one or more sources. In FIG. 1, database 14 is a data source, and it may also function as a storage device that receives data from external sources. More than one database may be used. In certain examples, the data from the various data sources may be stored in a data warehouse or data lake (not shown) that may then be queried and operated on by computer system 10.

Ultimately, computer system 10 is configured to receive and process information from an arbitrary number of data sources. In certain instances, the data sources may include internal data sources (e.g., that are operated by the same organization that is operating computer system 10). Data sources may include data wire service providers (e.g., a data "wire" service similar in the way Reuters is a news service). In certain instances, the data sources may be subscribed to by system 10. The data sources and the data formats for those data sources may be heterogeneous or homogeneous in nature, and as such, any type of data format may be acceptable.

Input data (numeric or otherwise) is stored in the database 14 as input data sets. Input data sets may be different types of data and may be in any form including in tabular form with columns or in some other organized form of elements or nodes. Each data set typically includes multiple, indexed data values, e.g., a temperature data set might have a list of temperature values in centigrade. Examples of data sets in the context of neural network data analysis include features, engineered features, and derived features. Examples of indexed data values in the context of neural networks include prediction vectors, input vectors, and columns of data from a database. Other example types of input data sets include temperature data gathered from one or more temperature sensors, electronic exchange data for one or more securities, service call data such as the total number of call that a company received in a 24 hour period, location and tonnage of cargo ships in ports, satellite imagery of ecological events, and many other types of data. Virtually any type of data set may be received and analyzed.

A user interface 12 receives input data sets from the database 14 along with one or more target metrics and a desired number of synthesized data sets to be generated and output by the system 10 for a user or for another computer system. A target metric is a measure that is useful for quantitatively assessing, controlling, and/or selecting something including, for example, a process, event, or institution. A synthesized data set is generated using two or more input data sets combined using one or more mathematical operators or functions. One example is taking an average of two input data sets to generate a synthesized data set.

A neural network 16, having multiple processing nodes, receives the input data sets from the database 14 along with a target metric from the user interface 12. The neural network 16 is designed, trained, trimmed, and then used to generate the desired number of synthesized data sets using the input data sets. The synthesized data sets are processed by a synthesized data set naming module 20 which generates and assigns human-understandable names for each of the synthesized data sets. A synthesized data set processing module 18 receives the synthesized data sets from the neural network 16 and the assigned human-understandable names and provides named synthesized data sets for storage in the database 14 and to the user interface 12 for output.

In certain example embodiments, the neural network 16, the synthesized data set naming module 20, and synthesized data set processing module 18 may be implemented in a cloud-based computer environment and may be implemented across one or more physical computer nodes (such as, for example, a computer node as shown in FIG. 16). In certain examples, different components or modules of computer system 10 may be implemented on virtual machines implemented on corresponding physical computer hardware.

Description of Operation of the Computer System—FIGS. 2A-2B:

FIGS. 2A-2B are a flowchart showing example computer-implemented procedures implemented by the computer system 10 according to certain example embodiments.

In step S1, the user interface receives input data sets, a target metric, and a desired number of synthesized data sets that a user would like generated and provides the input data sets and target metric to the neural network (NN) 16 with multiple processing nodes $1_1$-$1_4$ in step S2. In steps $S3_{1\_4}$, each NN processing node processes the input data sets including weighting input data set values with corresponding input weight values to produce weighted input data set values, determines gate operations to select processing operations, and generates a node output by applying the gating operations to the weighted input data set values. The NN processing node weighting the processing node output with a node output weight value to produce a weighted node output in steps $S4_{1\_4}$, and a combining node combines the weighted outputs from the processing nodes to produce a value for the target parameter in steps $S5_{1\_4}$.

The neural network is iteratively trained by modifying the gate operations, the input weight values, and the node output weight value until the neural network reaches a convergence state at a converged target value for the target parameter in step S6. A decision is made in step S7 to detect when the neural network has reached the convergence state. Thereafter, one or more nodes of the multiple processing nodes are selected that have a larger magnitude node output weight value in step S8. In step S9, for each of the selected processing nodes, a subset of input data sets are selected from among the set of input data sets used as input for the corresponding selected processing node that have a larger magnitude input component weight value. Similarly in step S10, for each of the selected processing nodes, a subset of the gating operations are selected, and the selected subset of input data set values are processed using the selected subset of gating operations to produce one or more synthesized data sets in step S11.

Then in step S12, a human-understandable name is generated for each of the one or more synthesized data sets based on names of the selected input data sets and the selected subset of gating operations. The one or more synthesized data sets and their corresponding human-understandable names are sent to the user interface for output and/or stored in the database 14.

Description of Sub-System—FIG. 3

FIG. 3 illustrates sub-system diagram showing functional modules of the neural network 16 and an interpreter module 28 according to certain example embodiments.

A brief overview of certain aspects of the neural network 16 is now provided. The neural network 16 groups input data sets according to similarities among the input data sets by learning to approximate an unknown function between any input and any output. In the process of learning, the neural network finds a function that transforms the input into the output. Each processing node in a layer of nodes in the neural network combines input data sets with a set of coefficients, or weights, that either increase or decrease that input, thereby assigning significance to input data sets for the target metric the neural network is trying to learn. These input-weight products or weighted input datasets are summed, and the sum is passed through a processing node's activation function to determine whether and to what extent that sum signal progresses further through the network to affect the ultimate neural network output.

When training the neural network, each node layer learns automatically by repeatedly trying to produce or reconstruct the target metric. Each training iteration produces an error measurement or "loss" between the weighted input and the target metric, and the error is used to adjust the weights to the extent they contributed to the error. A collection of weights, whether at the start or end state of training, is also called a model. A neural network can be viewed as a corrective feedback loop, rewarding (increasing) weights that reduce error and punishing (decreasing) weights that increase error.

At a high level, each processing node is like a switch that turns on and off depending on whether or not it should let the input pass through to affect the ultimate decisions of the neural network. A non-linear function translates the input to shape the node output. The nonlinear function at each node may be an s-shaped function similar to a logistic regression (see the Sigmoid function illustrated in FIG. 4). The outputs of all nodes, each having been translated into a space between 0 and 1, are then passed as input to the next layer in a feed forward neural network, and so on until the signal reaches the final layer of the network, where decisions are made.

One commonly used optimization function called "gradient descent" adjusts weights according to the error they caused until the error cannot be reduced any more or reaches a threshold value. The neural network converges when it has reached that threshold error, and at that convergence point, the neural network is "trained."

Returning to FIG. 3, input data sets are provided to an exponentially weighted moving average (EWMA) layer 22 and to a "hard" neural arithmetic logic unit (NALU) layer 24. The EWMA layer 22 applies a learned smoothing function to time-series data or spatial data that may be collapsed to a lower dimensionality. Each layer of the neural network includes multiple processing nodes that perform a number of operations (including activation or gating and then gated processing operations) on the input data sets, after the input data sets are weighted, to produce node outputs that are also weighted and passed on to nodes in the next layer in the neural network. The neural network is trained by modifying the gating operations via stochastic gradient descent in an iterative training process of the neural network. Other optimization functions may be used as well. The adjusted weight values are provided to the hard NALU layer 24, a module 32 for determining the input data sets actually to be used, and to a gated operator module 34.

The output from the hard NALU layer 24 is a tensor of values and is provided to a synthesized data set importance module 36 in the interpreter module 28 along with the adjusted weights and to a dense connection to regression or classification module 26. The dense connection to regression or classification module 26 calculates the neural network's final output which comprises the input data sets, the hard NALU layer 24, the EWMA layer 22, and the dense connection 26. This final output is used to calculate the neural network's loss function used in training the network.

The data set input module 32 processes the input weights from the EWMA layer 22 and outputs the input data sets that are actually to be used by the trained neural network to the gating operations module 34. The gating operations module 34 processes the gate operations weights from the EWMA layer 24 along with the input data sets from the data set input module 32. The synthesized data set importance module 36 processes weights from the hard NALU layer 24 and determines which synthesized data sets are important. The gating operations module 34 provides an array of human-understandable names that relate input data sets to each other as described above, and the synthesized data set importance module 36 provides information about which input human-understandable names to pass to the synthesized data set naming module 20. The synthesized data set names from the synthesized data set naming module 20 are combined with the synthesized data set numbers at the synthesized data set module 18 and provided to the user interface 12 and/or database 14 as shown in FIG. 1.

Traditional Sigmoid Function Compared to Hard Sigmoid Nonlinearity—FIG. 4:

FIG. 4 is a graph that illustrates a hard sigmoid activation function compared to an s-shared sigmoid activation function used in processing nodes of the neural network 16 according to certain example embodiments. Again, an activation function in each neural network processing node determines whether and to what extent that a weighted input data set progresses further through the network to affect the ultimate outcome. The Sigmoid function is a smooth s-shaped curve as compared to the hard Sigmoid which is step shaped giving a more binary output (0 or 1) and thereby simplifies node processing as compared to using the s-shaped Sigmoid.

Each NALU layer 24 processing node performs the following functions on input data set values:

$$W = \tan \hat{W} \odot \text{sig } \hat{M} \quad (1)$$

$$g = \text{hard\_sig}(G) \quad (2)$$

$$a = Wx \quad (3)$$

$$m = e^{W \log(|x| + \epsilon)} \quad (4)$$

$$\text{node output} = (g \odot a) + (1-g) \odot m \quad (5)$$

W is a weight layer which operates and is modified as described above, $\hat{W}$, $\hat{M}$, G are arbitrary tensors (a tensor is a matrix with an arbitrary number of dimensions), $\odot$ is element-wise multiplication, 'g' is an operator selection function (sometimes called a gating function) that determines whether addition and subtraction operators (functions) are used or multiplication and division operators (functions) are used in processing node output equation (5). The weights for $\hat{W}$, $\hat{M}$, and G are adapted by stochastic gradient descent against a loss function as described above. The variable 'a' is an addition/subtraction decision, 'm' is a multiplication/division decision, and 'x' represents weighted input data set values.

Significantly, the operator selection function in equation (2) uses a hard Sigmoid so that in equation 5 either the addition/subtraction operations are performed and the multiplication/division operations are not, or the multiplication/division operation are performed and the addition/subtraction operations are not. The calculation of 'g' is input agnostic making the set of operators used by NALU constant regardless of different input data sets. This differs from an implementation where the gating operation G is modified by the input, making the operator chosen for any prediction dependent on the specific input.

The gating operations module 34 performs the following:

$$a_1 g_1 m_1 1-g_1$$

$$a_2 g_2 m_2 1-g_2$$

$$a_3 g_3 m_3 1-g_3$$

$$\text{node output} = a_4 \odot g_4 + m_4 \odot 1-g_4$$

$$\ldots$$

$$a_{n-1} g_{n-1} m_{n-1} 1-g_{n-1}$$

$$a_n g_n m_n 1-g_n \quad (6)$$

Synthesized output data sets $y_i$ are generated using the following equation:

$$y_i = a_i \odot g_i + m_i \odot (1-g_i) \quad (7)$$

Gating operators ($g_i$) tend to take on values of 0 and 1 due to the hard sigmoid non-linearity on G, from the equations described above. As a result, each synthesized data set tends to be associated with a function comprised of either addition and subtraction operations or multiplication and division operations, but not both, which reduces processing time, power consumption, and processing complexity of the neural network. The operator here is a pointer that points either to the multiplication and division operations or to the addition and subtraction operations. The value of the gating operator then selects the operation from the pointed-to operations. The gating operator ($g_i$) is interpreted in the following way:

$$+ \text{ and } -: g_i > 0.5 \quad (8)$$

$$* \text{ and } \div: g_i < 0.5 \quad (9)$$

This gating operations information in equations (8) and (9) is used to generate synthesized data sets in accordance with equation (7) such as in step S11 in FIG. 2. This gating operations information is also used to process input data sets by processing nodes in accordance with equation (5) such as in steps $S3_1$-$S3_4$ in FIG. 2. This gating operations information is provided to the synthesized data set name generator module 20 for use in generating human-understandable names such as in step S12 in FIG. 2B.

Description of L-Type Regularizations FIG. 5

FIG. 5 is a graph that illustrates three L-type regularizations of the neural network weights described above: L2, L1, and L½. L regularization is used in NN weight training by modifying the loss function based on the weights used in the various layers. In example embodiments, L½ regularization is applied with the weights W described above to promote sparsity. A sparse model is one with relatively few parameters, and its parameters have high importance. As a result, just the inputs that are most relevant to the prediction process may be used.

Figure 6:
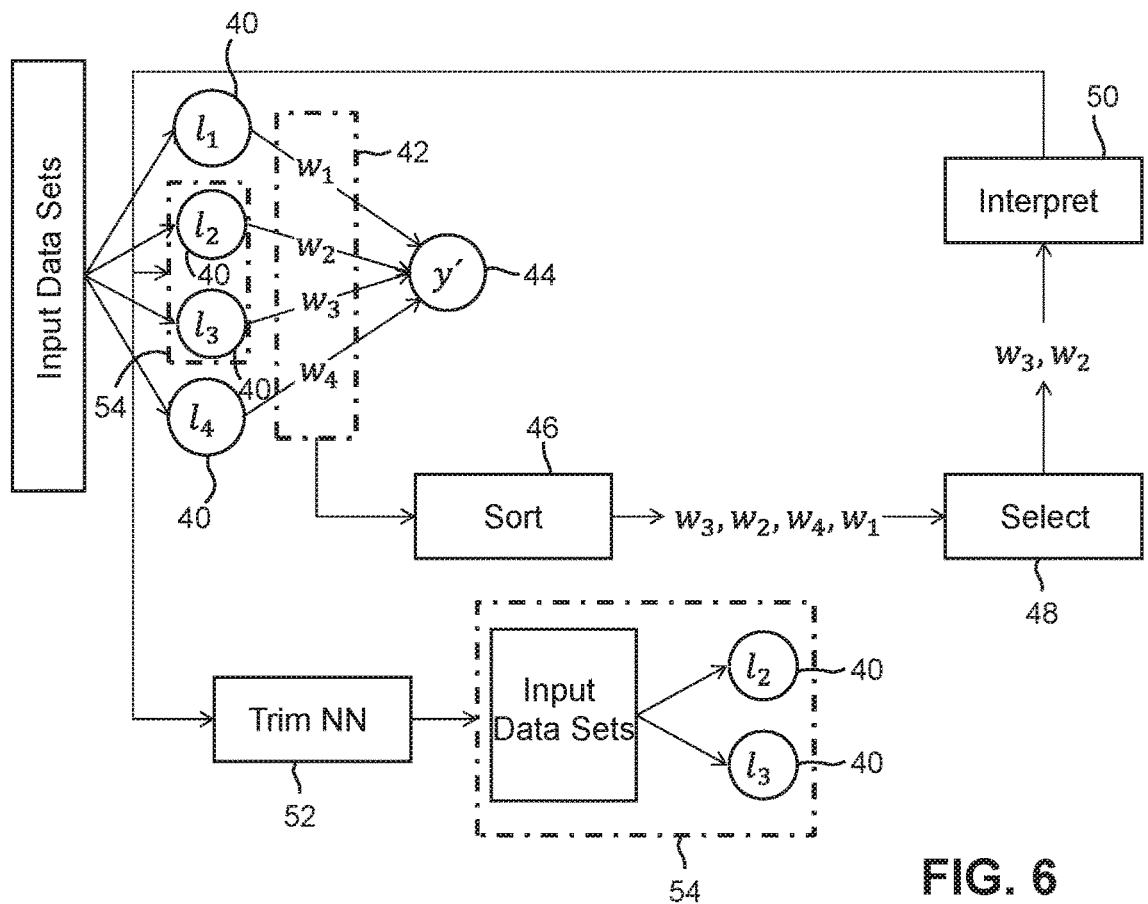
FIG. 6 is a diagram that illustrates example processing functions and data flow for processing input data sets to train and then trim the neural network according to example embodiments.

Description of Neural Network Training and Trimming—FIG. 6

FIG. 6 is a diagram that illustrates example processing functions and data flow for processing input datasets to train (see step S6 in FIG. 2A) and then trim (see steps S8 and S9 in FIG. 2B) the neural network 16 according to example embodiments.

In a neural network training phase, raw input data sets are provided to each of four example NN processing nodes 40 labeled $l_1$-$l_4$. Each node applies a corresponding adjustable input data set weights (not shown) and corresponding adjustable node output weights 42 labeled $w_1$-$w_4$ and applies the hard sigmoid activation function as described above along with the operations as set forth in equations (1)-(6) and (8)-(9). The weighted outputs are combined in a combiner node 44 to generate a predicted value y' for a target metric or parameter. Based on a loss/error function, the neural network is iteratively trained by modifying the gating operations, the input weight values, and the node output weight values until the neural network loss/error reaches a convergence state at a converged target value for the target parameter. Gating operations include logic operations like those accomplished by logic gates, e.g., an OR gate, that route messages in each NN processing node to either addition/subtraction +− processing operations or multiplication/division */ processing operations. The input weights, the gating operations, and the output weights are modified via stochastic gradient descent, for example, in the iterative training process.

After training, the output weights 42 $w_1$-$w_4$ are sorted by magnitude in a sorting module 46, and the largest magnitude weights, in this example $w_2$ and $w_3$, which have the most significance in affecting the output y' are selected by selecting module 48 and provided to an interpreter module 50.

The interpreter module 50 aligns the selected weight with an associated node in the prior layer of the neural network and provides this set of associated nodes to a trimming module 52 which trims the neural network. The trimming module 52 selects a subset of the processing nodes 40 that are the most significant in terms of their effect on the output y' based on the selected weights. In this example, processing nodes $l_2$ and $l_3$ are selected because their corresponding output weights, $w_2$ and $w_3$, have the largest node output weight magnitudes. The trimming module 52 produces a trained and trimmed neural network 54 that uses just the selected processing nodes $l_2$ and $l_3$, the selected weights, and the selected gating operations.

Description of Input Data Set Trimming—FIG. 7

FIG. 7 is a diagram that illustrates example processing functions and data flow for processing input datasets, after the neural network 16 is trained, to determine the most significant input datasets by trimming the neural network 16 as in steps S8 and S9 in FIG. 2B, according to example embodiments. The processing is similar to, but distinct from, the processing of the node output weights 42 $w_1$-$w_4$ described above. In this case, the input weights 56 $w_1$-$w_4$ are processed for each individual selected processing node 40 and sorted by magnitude in the sorting module 46. The sorting module 46 then selects ones of the input weights 56, in this example $w_2$ and $w_3$, which have larger magnitudes and the most significance in affecting the output y' are selected by selecting module 48 and provided to interpreter module 50. This input weight sorting and selection (trimming) is performed for each of the selected processing nodes 40. The interpreter module 50 then associates the selected weights to the input data sets.

The synthesized data set processor 18 processes the names of the selected input data sets, the selected gating operations, and the selected processing nodes 40 and generates a name (e.g., a phrase or label) describing the synthesized data set that is understandable by a human. As a simple example, assume that synthesized data set processor 18 determines that a synthesized data set #2 is important, and that a combination of addition and subtraction processing operators are used to calculate input-operator data set pairs: input A-, input B+, and input C+. The synthesized data set processor 18 generates a phrase "total B and C less A" as the name for the synthesized data set. The word "total" is used to describe "+" and the word "less" is used to describe "-".

Description of a Specific Example of Input Data Sets—FIG. 8

FIG. 8 is a table that illustrates example input datasets (see S1 in FIG. 2A) for use in an example application to certain Federal Reserve data according to example embodiments. The table includes an index in the leftmost column for each row corresponding to specific dates. The first data set corresponds to the target output y' which in this example is the column of data values for an unemployment rate (UNRATE). The second data set is an input data set and is a column of input data values for West Texas Crude Oil Spot Price (WTISPLC). The third data set is an input data set and is a column of input data values for Industrial Productivity (INDPRO). The fourth data set is an input data set and is a column of input data values for Consumer Price Index (CPIAUCSL).

Figure 9:
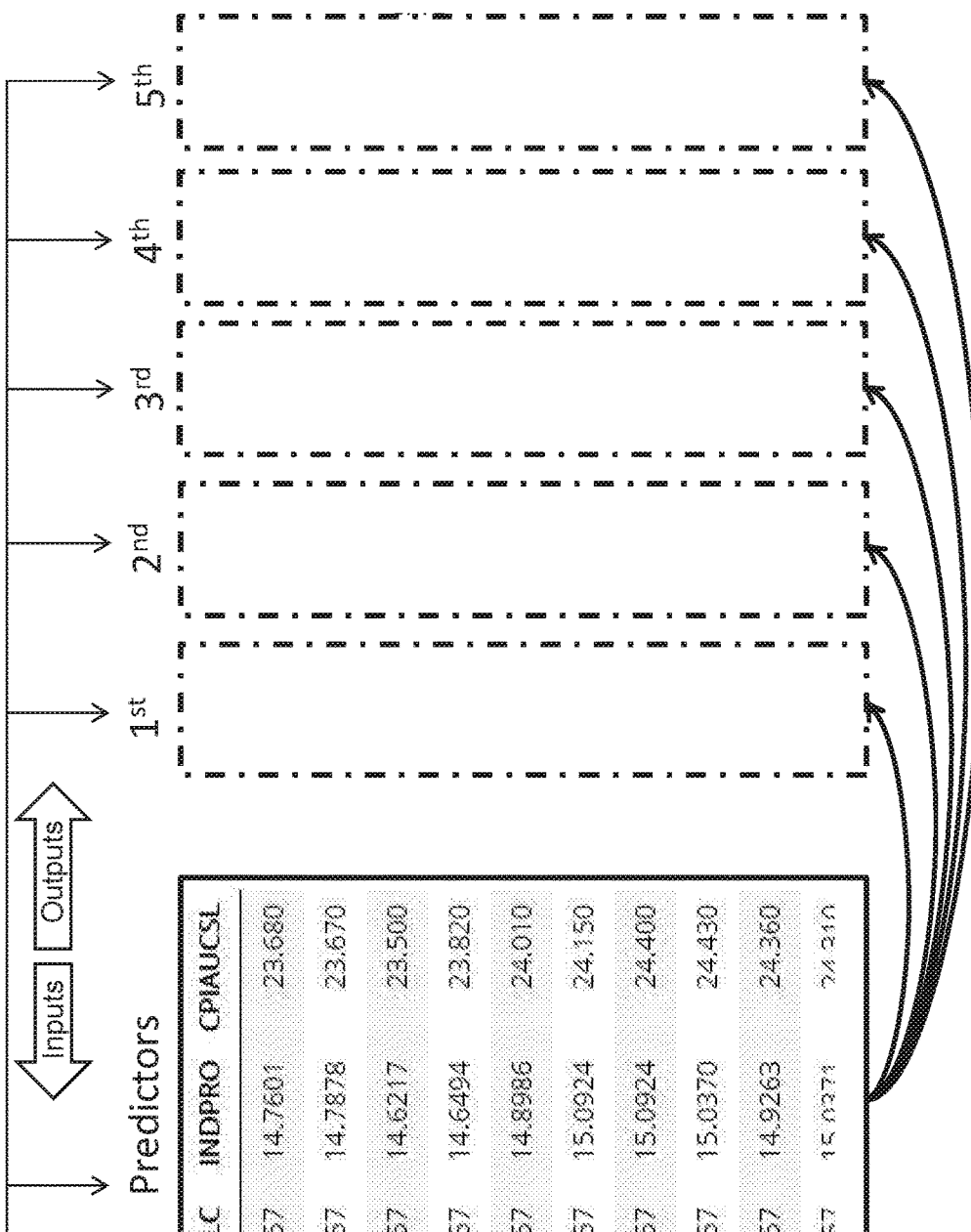
FIG. 9 is a table that illustrates example user definitions for input data sets and a number of synthesized output data sets in the context of the Federal Reserve data example application according to example embodiments.

Description of User Definitions—FIG. 9

FIG. 9 is a table that illustrates example user definitions for input data sets (see S1 in FIG. 2A) and a number of synthesized output data sets (see S11 in FIG. 2B) in the context of the Federal Reserve data example in FIG. 8. The inputs correspond to the date index, UNRATE target, and the WTISPLC, INDPRO, and CPIAUCSL input data sets referred to as predictors in FIG. 9 because they are used to predict the UNRATE target output from the neural network. The outputs correspond to a number of synthesized data sets defined by the user via the user interface 12. In this case, the user defines that five synthesized data sets should be generated.

Description of Synthesized Data Sets—FIG. 10

FIG. 10 is a table that illustrates example synthesized datasets (see S11 in FIG. 2B) and human-readable names (see S12 in FIG. 2B) for the synthesized datasets according to the Federal Reserve data example application according to example embodiments. The human-readable names include: scaled WTISPLC-INDPRO, scaled WTISPLC-INDPRO per CPIAUCSL, scaled WTISPLC per CPIAUCSL, scaled INDPRO-WTISPLC, and scaled INDPRO per CPIAUCSL. The values for the synthesized datasets are provided in a column under the corresponding human-understandable name. The "-" means the product of CPI and Industrial Productivity. The scaled WTISPLC-INDPRO per CPIAUCSL means a differential between crude oil prices and the sum of industrial productivity and CPI. The scaled WTISPLC per CPIAUCSL means the ratio of crude oil prices to CPI. The scaled INDPRO-WTISPLC means the product of industrial productivity and crude oil price. The scaled INDPRO per CPIAUCSL means the ratio of industrial productivity to CPI. The table of data in FIG. 10 may then be stored in the database 14 and/or provided for output at the user interface 12.

Figure 11:
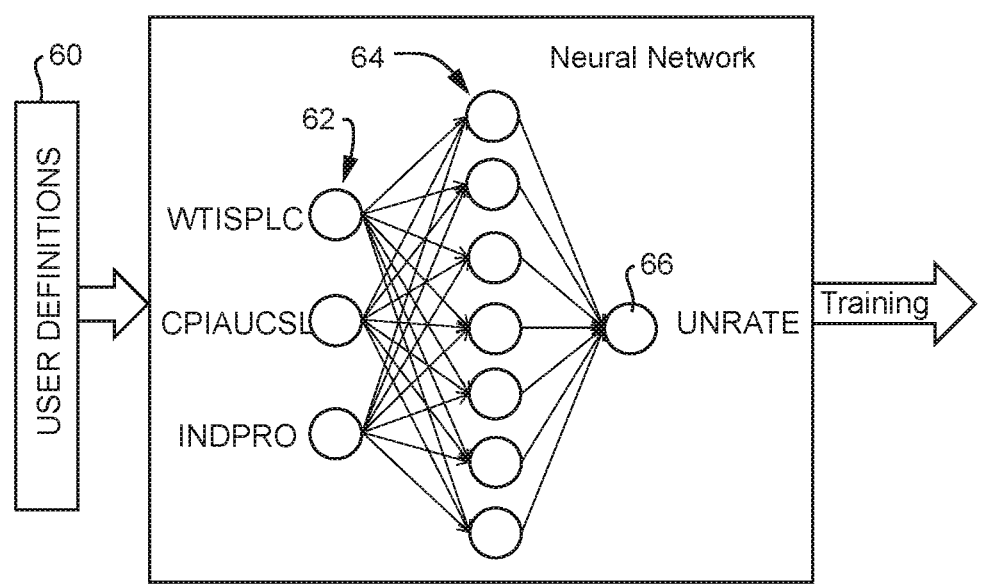
FIG. 11 is a diagram that illustrates example design of a neural network based on user definitions for the Federal Reserve data example application according to example embodiments.

Description of the Neural Network Design for the Federal Reserve Data Set Example—FIG. 11

FIG. 11 is a diagram that illustrates example design of a neural network based on user definitions for the Federal Reserve data example application according to example embodiments. The user definitions for the neural network in FIG. 9 are provided as inputs (see S2 in FIG. 2A), and input data sets 62 (WTISPLC, INDPRO, and CPIAUCSL) are configured for weighting and input to each of multiple NN processing nodes 64 (see S3 in FIG. 2A). The outputs from each of the processing nodes 64 are weighted and combined as combiner module 66 to generate a value for the target UNRATE. At this point, the neural network undergoes training (see S5 in FIG. 2A).

Figure 12:
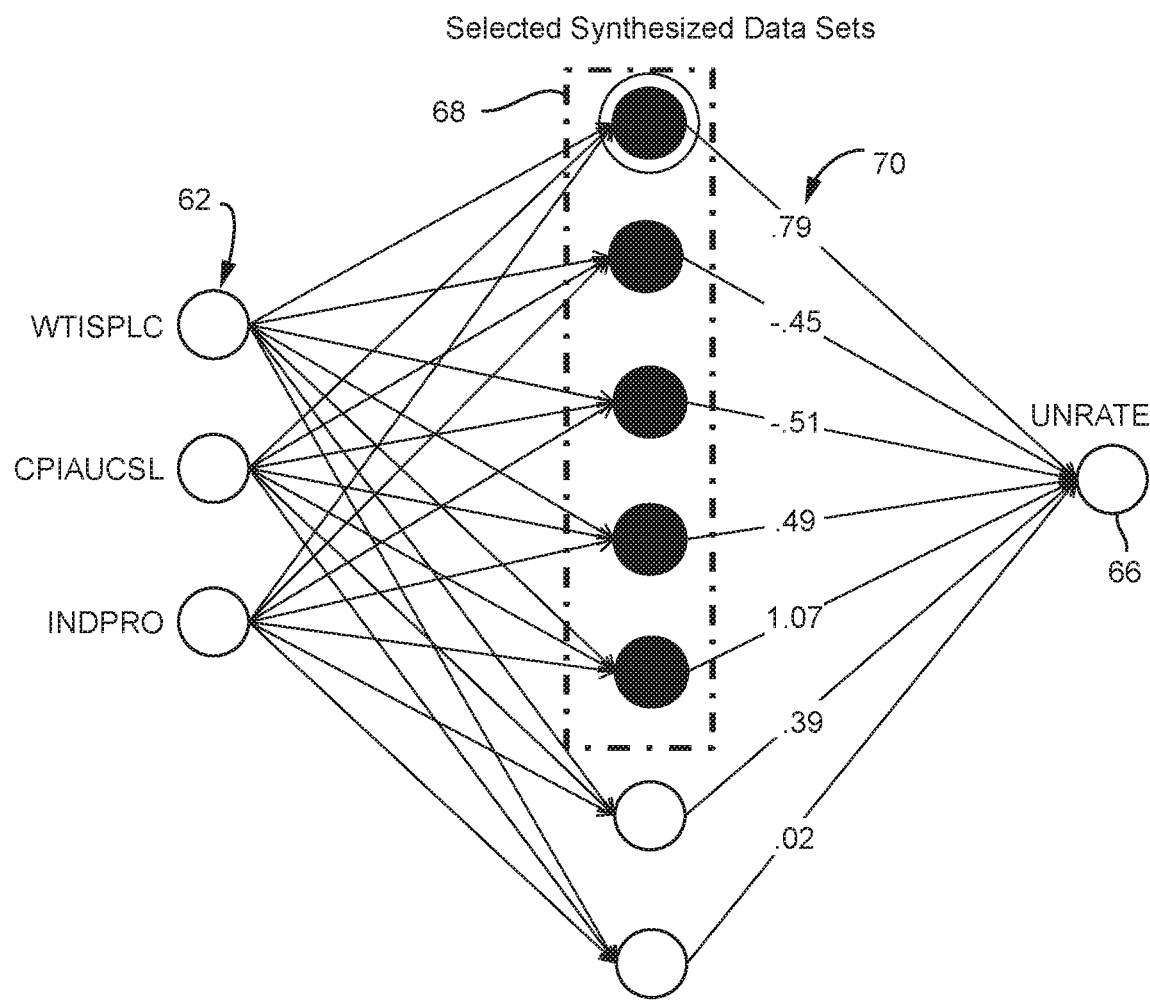
FIG. 12 is a diagram that illustrates an example of the neural network in FIG. 11, after training, where certain processing nodes are selected that have largest magnitude weights for the Federal Reserve data example application according to example embodiments.

Description of Selecting Most Important NN Processing Nodes—FIG. 12

FIG. 12 is a diagram that illustrates an example of the neural network in FIG. 11, after training, where certain processing nodes are selected for the Federal Reserve data example according to example embodiments. A subset of processing nodes 68 are selected from the initial set of processing nodes 40 that have larger magnitude output weights 70 in terms of impact on the target UNRATE 66 (see S8 in FIG. 2B).

Figure 13:
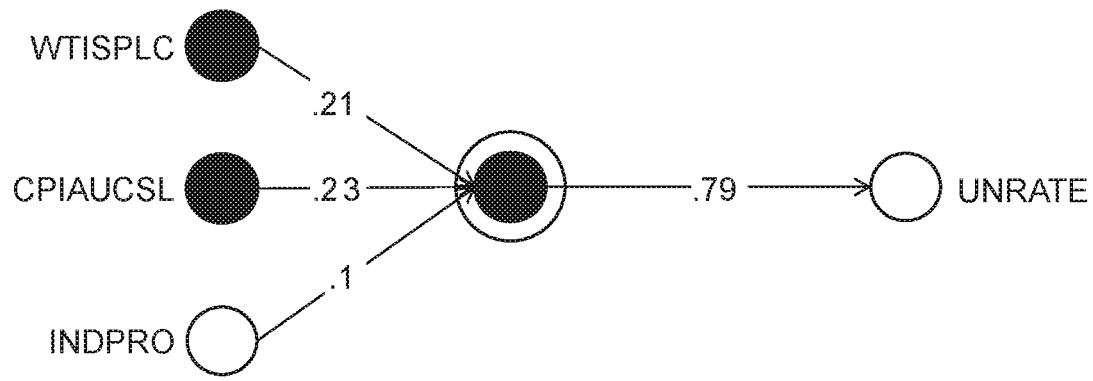
FIG. 13 is a diagram that illustrates, using the example of the neural network in FIGS. 11 and 12, where certain input data sets are selected that have largest magnitude weights for the Federal Reserve data example application according to example embodiments.

Description of Selecting Most Important Input Data Sets—FIG. 13

FIG. 13 is a diagram that illustrates, using the neural network example in FIGS. 11 and 12, where certain input data sets are selected that have larger magnitude weights for the Federal Reserve data example according to example embodiments (see S9 in FIG. 2B). Here, the input data sets are analyzed and selected for each of the selected processing nodes 68. The selected processing node in FIG. 13 corresponds to the node circled in the top left which has one of the largest magnitude output weights of 0.79. The three input data sets WTISPLC, INDPRO, and CPIAUCSL are respectively weighted before input to the processing node. Only WTISPLC and CPIAUCSL are selected because of their larger weights 0.021 and 0.23 as compared to the smaller weight 0.1 for INDPRO.

Figure 14:
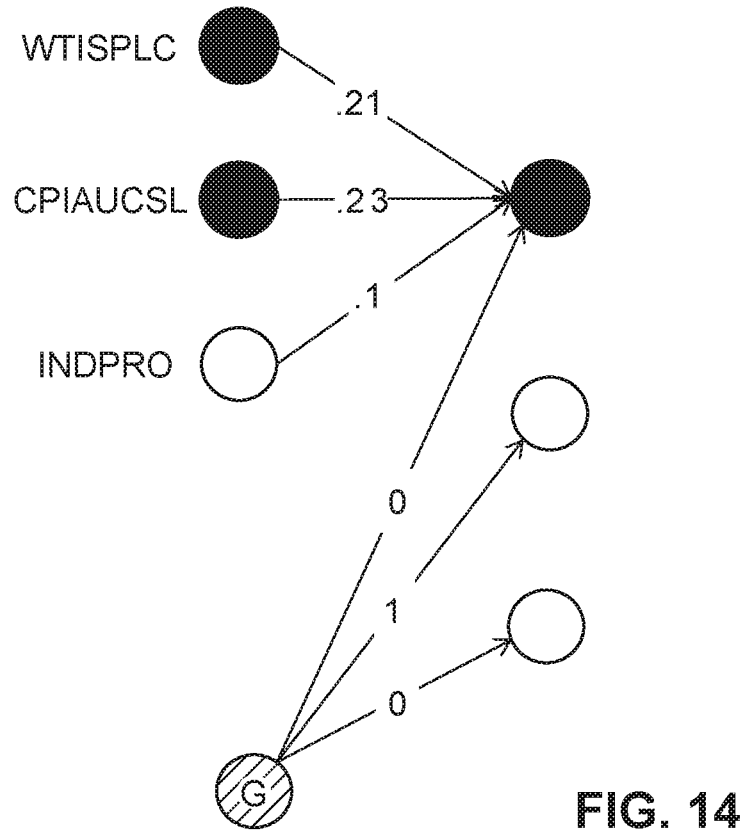
FIG. 14 is a diagram that illustrates an example of the neural network in FIG. 11, after training, where a subset of mathematical operators for one of the selected processing node is selected, for the Federal Reserve data example application according to example embodiments.

Description of Selection of Gating Operations—FIG. 14

FIG. 14 is a diagram that illustrates an example of the neural network in FIG. 11, after training, where a subset of gating operations for the selected processing node is selected, for the Federal Reserve data example according to example embodiments (see S10 in FIG. 2B). The gating operators have corresponding hard sigmoid values for each NN processing node. Continuing with the example from FIG. 13, for the selected NN processing node (at the top), the gating operators are selected with the value 0 corresponding to selection of multiply and divide gating operations. The value 1 corresponds to selection of addition and subtraction gating operations. Again, this simplifies and speeds up the processing in each of the selected NN processing nodes.

Figure 15:
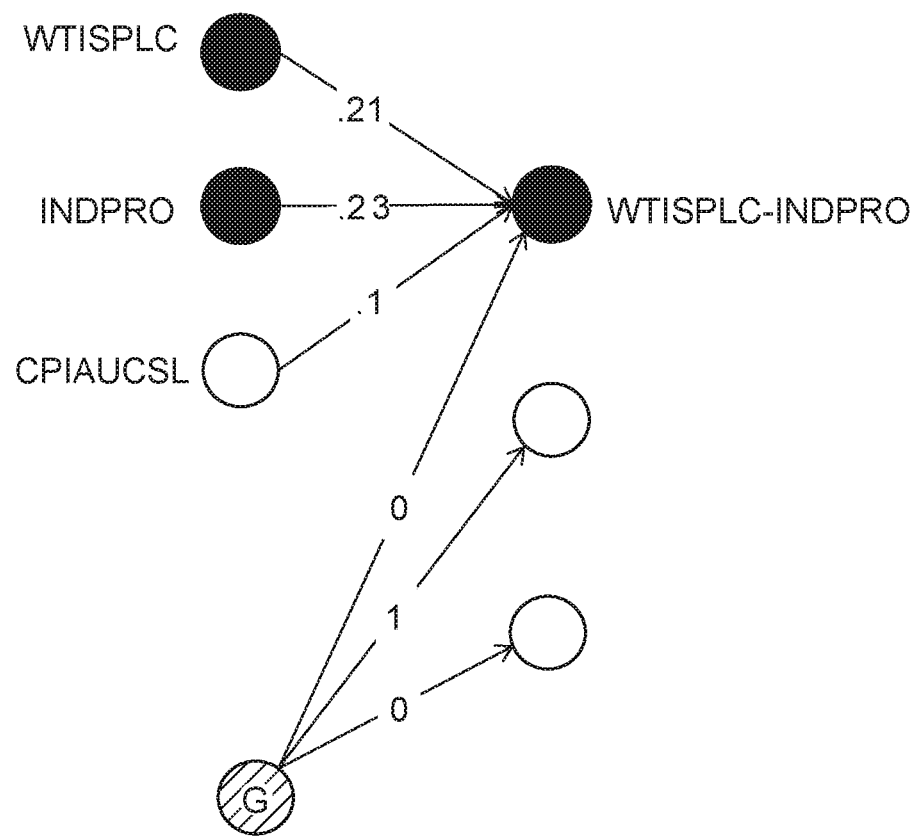
FIG. 15 is a diagram that illustrates an example of synthesizing human-understandable names for synthesized data sets in the Federal Reserve data example application according to example embodiments.
Figure 16:
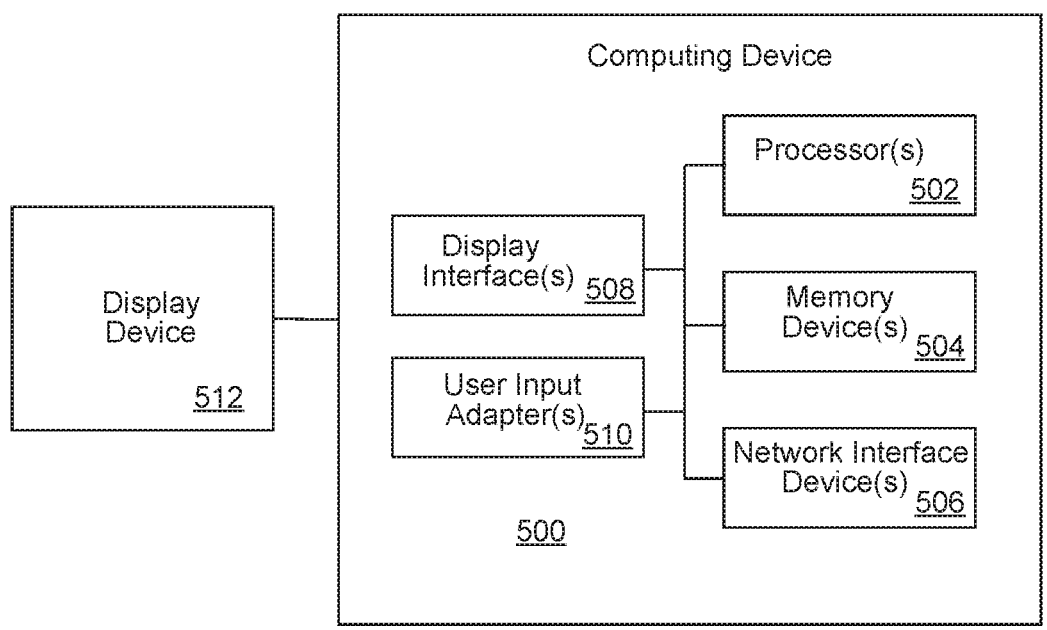
FIG. 16 shows an example computing system that may be used in some embodiments to implement features described herein.

Description of Synthesized Data Set Name Generation—FIG. 15

FIG. 15 is a diagram that illustrates an example of synthesizing human-understandable names for synthesized datasets in the Federal Reserve data example application according to example embodiment (see S12 in FIG. 2B). In this example, the human-understandable name generated for the synthesized data set using the selected WTISPLC and CPIAUCSL datasets from the initial set of WTISPLC, INDPRO, and CPIAUCSL, is named WTISPLC-CPIAUCSL which is understood by a human as the product of WTISPLC (crude oil prices) and CPIAUCSL (consumer price index).

The synthesized data set, WTISPLC-CPIAUCSL, in this case, is useful for understanding variance in unemployment rate (UNRATE). This synthesized data set includes more information for understanding the variance in unemployment rate than other permutations of inputs and operators. The human-understandable nature of the name for the synthesized data set, WTISPLC-CPIAUCSL, and its usefulness for tasks in analyzing other aspects of variation are additional advantages. For example, this synthesized data set may be useful to other measures, similar to unemployment rate, and/or understanding the underlying mechanisms of unemployment variation.

Description of FIG. 16

FIG. 16 shows an example computing system that may be used in some embodiments to implement features described herein. An example computing device 500 (which may also be referred to, for example, as a "computing device," "computer system," or "computing system") includes one or more of the following: one or more hardware processors 502; one or more memory devices 504; one or more network interface devices 506; one or more display interfaces 508; and one or more user input adapters 510. Additionally, in some embodiments, the computing device 500 is connected to or includes a display device 512. As will explained below, these elements (e.g., the hardware processors 502, memory devices 504, network interface devices 506, display interfaces 508, user input adapters 510, display device 512) are hardware devices (for example, electronic circuits or combinations of circuits) that are configured to perform various different functions for the computing device 500.

In some embodiments, each or any of the hardware processors 502 is or includes, for example, a single- or multi-core hardware processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 502 uses an instruction set architecture such as x86 or Advanced RISC Machine (ARM).

In some embodiments, each or any of the memory devices 504 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 502). Memory devices 504 are examples of non-volatile computer-readable storage media.

In some embodiments, each or any of the network interface devices 506 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, each or any of the display interfaces 508 is or includes one or more circuits that receive data from the hardware processors 502, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 512, which displays the image data. Alternatively or additionally, in some embodiments, each or any of the display interfaces 508 is or includes, for example, a video card, video adapter, or graphics processing unit (GPU).

In some embodiments, each or any of the user input adapters 510 is or includes one or more circuits that receive and process user input data from one or more user input devices (not shown in FIG. 16) that are included in, attached to, or otherwise in communication with the computing device 500, and that output data based on the received input data to the hardware processors 502. Alternatively or additionally, in some embodiments each or any of the user input adapters 510 is or includes, for example, a PS/2 interface, a USB interface, a touchscreen controller, or the like; and/or the user input adapters 510 facilitates input from user input devices (not shown in FIG. 16) such as, for example, a keyboard, mouse, trackpad, touchscreen, etc.

In some embodiments, the display device 512 may be a Liquid Crystal Display (LCD) display, Light Emitting Diode (LED) display, or other type of display device. In embodiments where the display device 512 is a component of the computing device 500 (e.g., the computing device and the display device are included in a unified housing), the display device 512 may be a touchscreen display or non-touchscreen display. In embodiments where the display device 512 is connected to the computing device 500 (e.g., is external to the computing device 500 and communicates with the computing device 500 via a wire and/or via wireless communication technology), the display device 512 is, for example, an external monitor, projector, television, display screen, etc.

In various embodiments, the computing device 500 includes one, or two, or three, four, or more of each or any of the above-mentioned elements (e.g., the hardware processors 502, memory devices 504, network interface devices 506, display interfaces 508, and user input adapters 510).

Alternatively or additionally, in some embodiments, the computing device 500 includes one or more of: a processing system that includes the hardware processors 502; a memory or storage system that includes the memory devices 504; and a network interface system that includes the network interface devices 506.

The computing device 500 may be arranged, in various embodiments, in many different ways. As just one example, the computing device 500 may be arranged such that the hardware processors 502 include: a multi (or single)-core hardware processor; a first network interface device (which implements, for example, WiFi, Bluetooth, NFC, etc. . . . ); a second network interface device that implements one or more cellular communication technologies (e.g., 3G, 4G LTE, CDMA, etc.); memory or storage devices (e.g., RAM, flash memory, or a hard disk). The hardware processor, the first network interface device, the second network interface device, and the memory devices may be integrated as part of the same SOC (e.g., one integrated circuit chip). As another example, the computing device 500 may be arranged such that: the hardware processors 502 include two, three, four, five, or more multi-core hardware processors; the network interface devices 506 include a first network interface device that implements Ethernet and a second network interface device that implements WiFi and/or Bluetooth; and the memory devices 504 include a RAM and a flash memory or hard disk.

As previously noted, whenever it is described in this document that a software module or software process performs an action, operation, or function, the action, operation, or function is in actuality performed by underlying hardware elements according to the instructions that comprise the software module. Consistent with the foregoing, in various embodiments, each or any combination of the computer system 10, neural network 16, synthesized data set module 18, synthesized data set label generator 20, EWMA layer 22, hard NALU layer 24, dense connection to regression or classification 26, interpreter 28, gating operations module 34, synthesized data set importance module 36, sorting module 46, selecting module 48, interpreter module 50, and trimming module 54, each of which will be referred to individually for clarity as a "component" for the remainder of this paragraph, are implemented using an example of the computing device 500 of FIG. 16. In such embodiments, the following applies for each component: (a) the elements of the 500 computing device 500 shown in FIG. 16 (i.e., the one or more hardware processors 502, one or more memory devices 504, one or more network interface devices 506, one or more display interfaces 508, and one or more user input adapters 510), or appropriate combinations or subsets of the foregoing) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices 504 (e.g., in various embodiments, in a volatile memory device such as a RAM or an instruction register and/or in a non-volatile memory device such as a flash memory or hard disk) and all actions described herein as performed by the software modules are performed by the processors 502 in conjunction with, as appropriate, the other elements in and/or connected to the computing device 500 (i.e., the network interface devices 506, display interfaces 508, user input adapters 510, and/or display device 512); (c) alternatively or additionally, to the extent it is described herein that the component processes and/or otherwise handles data, in some embodiments, such data is stored in the memory devices 504 (e.g., in some embodiments, in a volatile memory device such as a RAM and/or in a non-volatile memory device such as a flash memory or hard disk) and/or is processed/handled by the processors 502 in conjunction, as appropriate, the other elements in and/or connected to the computing device 500 (i.e., the network interface devices 506, display interfaces 508, user input adapters 510, and/or display device 512); (d) alternatively or additionally, in some embodiments, the memory devices 502 store instructions that, when executed by the processors 502, cause the processors 502 to perform, in conjunction with, as appropriate, the other elements in and/or connected to the computing device 500 (i.e., the memory devices 504, network interface devices 506, display interfaces 508, user input adapters 510, and/or display device 512), each or any combination of actions described herein as performed by the component and/or by any software modules described herein as included within the component.

Consistent with the techniques described herein, as one example, in an embodiment where an instance of the computing device 500 is used to implement the computer system 10, the memory devices 504 could load program instructions for the functionality of the neural network 16, synthesized data set module 18, synthesized data set label generator 20, EWMA layer 22, hard NALU layer 24, dense connection to regression or classification 26, interpreter processor 28, gating operations module 34, synthesized data set importance module 36, sorting module 46, selecting module 48, interpreter module 50, and trimming module 54. The data sets may be processed according the program instructions of these processors, modules, and layers to generate synthesized data sets that are provided to user devices and/or stored to memory devices.

The hardware configurations shown in FIG. 16 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 16, (e) via other hardware arrangements, architectures, and configurations, and/or via combinations of the technology described in (a) through (e).

Technical Advantages of Described Subject Matter

In certain example embodiments, the neural network based technology described generates synthesized data sets from a large number of possible input data sets (e.g., hundreds or thousands). The described features (e.g., the use of a hard gating operations selection function in the neural network processing nodes, selection and use of just significant input data sets, selection and use of just significant NALU processing nodes, and selection and use of just significant output data set weights) result in an approach to generating synthesized data sets that is more efficient than prior approaches, thereby resulting in improvements with respect to the amount of data that can be processed within a given time, power consumption, speed, and/or complexity. The technological improvements offered by the technology described herein can be applied in different domains, from health care, to media, to education, to finance, to security, to transportation, and many other industries and domains, to analyze very large numbers of different input data sets and generate useful synthesized data sets efficiently and accurately. In addition, the synthesized data sets are automatically named using human-understandable names to make the usefulness of the synthesized data sets significantly more apparent to a human user.

The techniques herein also allow for a high level of customization through the use of objectives, constraints, and penalties.

Selected Terminology

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

Additional Applications of Described Subject Matter

Although process steps, algorithms or the like, including without limitation with reference to FIGS. 1-15, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:

1. A computer system, comprising:
one or more user input adaptors configured to receive input data sets, a target metric, and a parameter that indicates a number of synthesized data sets to be generated;
a memory configured to store the input data sets, the target metric, the parameter that indicates the number of synthesized data sets, and a neural network, wherein the neural network includes a summing node and multiple processing nodes;
at least one hardware processor configured to perform operations that include:
at each processing node of the multiple processing nodes in the neural network:
(i) processing the input data sets, wherein the processing the input data sets includes weighting input data set values with corresponding input weight values to produce weighted input data set values, determining gating operations to select processing operations, and generating a node output by applying the gating operations to the weighted input data set values, and
(ii) weighting the node output with a node output weight value to produce a weighted node output; and
at the summing node in the neural network:
combining the weighted outputs from the multiple processing nodes to produce a value for the target metric;
iteratively training the neural network by modifying the gating operations, the input weight values, and the node output weight value until the neural network reaches a convergence state at a convergence value for the target metric;
when the neural network reaches the convergence state:
selecting one or more processing nodes of the multiple processing nodes that have a larger magnitude node output weight value;
selecting, for each selected processing nodes, a subset of the input data sets from among the input data sets used as input for the selected processing node that have a larger magnitude input component weight value, and selecting, for each selected processing nodes, a subset of the gating operations;

processing the subset of input data sets with the selected processing nodes using the subset of the gating operations to produce the number of synthesized data sets; and generating a name for each of the number of synthesized data sets based on names of the subset of input data sets and the subset of the gating operations.

2. The computer system in claim 1, wherein the subset of gating operations selected for each of the selected processing nodes corresponds to the subset of gating operations used when the neural network reached the convergence state.

3. The computer system in claim 1, wherein the subset of gating operations selected for each of the selected processing nodes corresponds either addition/subtraction operations or multiplication/division operations.

4. The computer system in claim 1, wherein each processing node includes a neural arithmetic logic unit (NALU).

5. The computer system in claim 4, wherein the gating operations within the NALU are independent of the input data sets.

6. The computer system in claim 1, wherein each processing node is configured to determine the subset of gating operations based on a hard sigmoid function.

7. The computer system in claim 1, wherein the at least one hardware processor is further configured to store the synthesized data sets and the name for each synthesized data set or to provide an output of the synthesized data sets and the name for each synthesized data set to a user device.

8. The computer system in claim 1, wherein the at least one hardware processor is configured to iteratively train the neural network by modifying the gating operations via stochastic gradient descent in the iterative training.

9. The computer system in claim 1, wherein the at least one hardware processor is configured to query and receive, via the one or more user input adaptors, input data packets including data sets from one or more databases over a data network.

10. A method, comprising:
at a system that includes at least one memory and at least one hardware processor:
receiving input data sets and a target metric and a parameter that indicates a desired number of synthesized data sets that a user would like generated;
executing instructions stored in memory to implement a neural network as follows:
each of multiple processing nodes of the neural network:
processing the input data sets including weighting input data set values with corresponding input weight values to produce weighted input data set values, determining gating operations to select processing operations, and generating a node output by applying the gating operations to the weighted input data set values, and
weighting the node output with a node output weight value to produce a weighted output;
combining the weighted outputs from the multiple processing nodes to produce a value for the target metric;

iteratively training, by the hardware processor, the neural network by modifying the gating operations, the input weight values, and the node output weight value until the neural network reaches a convergence value for the target metric;
when the neural network reaches the convergence value, the hardware processor:
selecting one or more nodes of the multiple processing nodes that have a larger magnitude node output weight value;
selecting, for each selected processing nodes, a subset of the input data sets from among the input data sets used as input for the selected processing node that have a larger magnitude input component weight value, and
selecting, for each selected processing nodes, a subset of the gating operations;
processing, by the hardware processor, the subset of the input data sets with the selected processing nodes using the subset of the gating operations to produce the desired number of synthesized data sets; and
generating, by the hardware processor, a name for each of the number of synthesized data sets based on names of the subset of the input data sets and the subset of the gating operations.

11. The method in claim 10, further comprising providing the desired number of synthesized data sets and the name for each of the desired number of synthesized data sets to a user interface.

12. The method in claim 10, wherein the input data sets are retrieved from one or more databases, the method further comprising providing the desired number of synthesized data sets and the name for each of the desired number of synthesized data sets to the one or more databases.

13. The method in claim 10, wherein the subset of gating operations selected for each of the selected nodes corresponds to the subset of gating operations used when the neural network reached the convergence value.

14. The method in claim 10, wherein the subset of gating operations selected for each of the selected nodes corresponds either addition/subtraction operations or multiplication/division operations.

15. The method in claim 10, the gating operations performed within each processing node are independent of the input data sets.

16. The method in claim 10, further comprising determining the subset of gating operations based on a hard sigmoid function.

17. The method in claim 10, further comprising iteratively training the neural network by modifying the gating operations via stochastic gradient descent in the iterative training.

18. The method in claim 10, further comprising trimming the neural network to remove unselected processing nodes.

19. The method in claim 10, further comprising trimming the neural network to remove unselected input data sets.

20. A non-transitory, computer-readable medium encoded with instructions that, when executed by at least one hardware processor, cause the at least one hardware processor to perform operations comprising:
receiving input data sets and a target metric and a parameter that indicates a desired number of synthesized data sets that a user would like generated;
executing instructions to implement a neural network as follows:
each of multiple processing nodes of the neural network:

processing the input data sets including weighting input data set values with corresponding input weight values to produce weighted input data set values, determining gating operations to select processing operations, and generating a node output by applying the gating operations to the weighted input data set values, and weighting the node output with a node output weight value to produce a weighted output;

combining the weighted outputs from the multiple processing nodes to produce a value for the target metric;

iteratively training the neural network by modifying the gating operations, the input weight values, and the node output weight value until the neural network reaches a convergence state at a convergence value for the target metric;

when the neural network reaches the convergence value:
　selecting one or more nodes of the multiple processing nodes that have a larger magnitude node output weight value;
　selecting, for each of the selected processing nodes, a subset of the input data sets from among the input data sets used as input for the selected processing node that have a larger magnitude input component weight value, and
　selecting, for each selected processing nodes, a subset of the gating operations;

processing the subset of the input data sets with the selected processing nodes using the subset of the gating operations to produce the desired number of synthesized data sets; and generating a name for each of the desired number of synthesized data sets based on names of the subset of the input data sets and the subset of the gating operations.

* * * * *